UNITED STATES PATENT OFFICE.

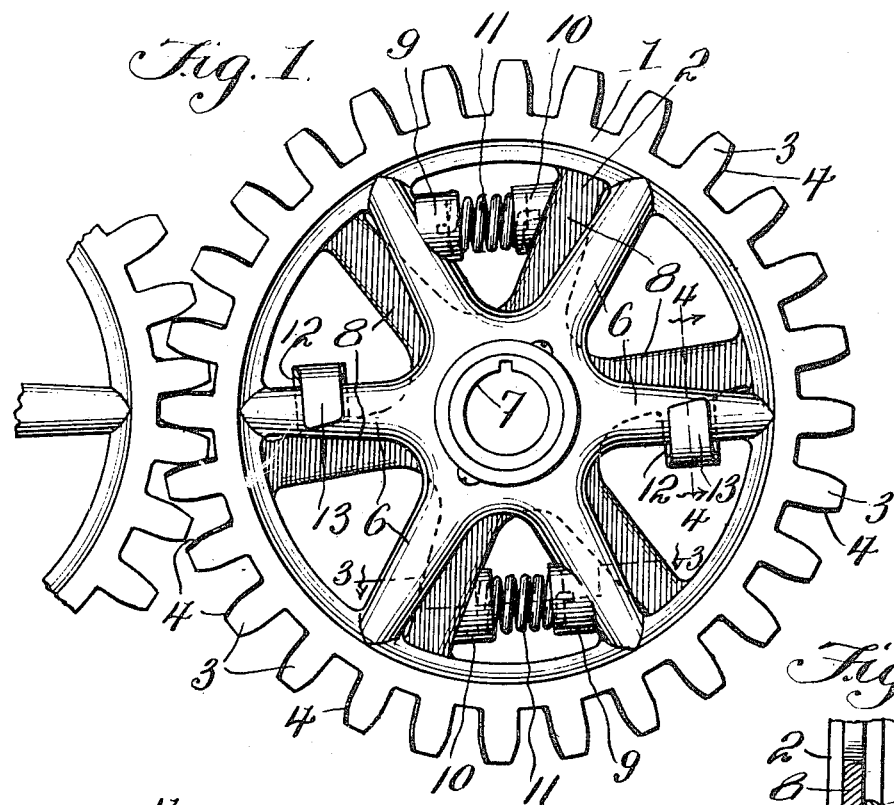
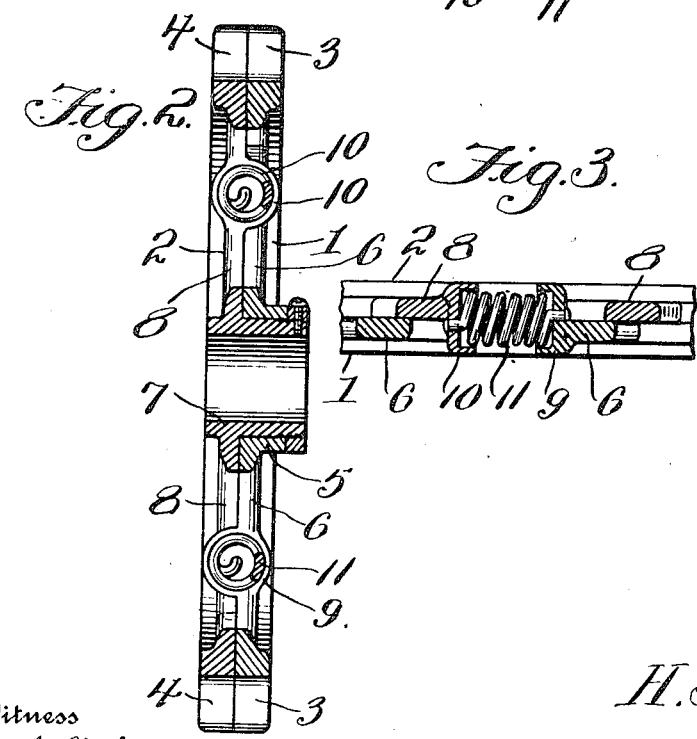
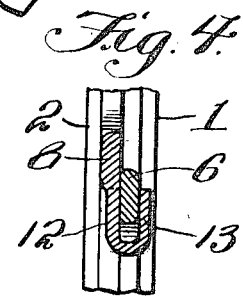
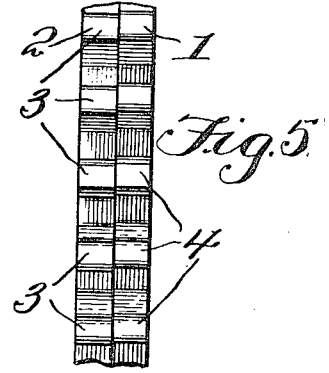

HENRY J. DUBOIS, OF PUTNAM, CONNECTICUT, ASSIGNOR OF ONE-HALF TO BYRON E. HOWARD, OF PUTNAM, CONNECTICUT.

ANTIRATTLING GEAR.

1,240,126. Specification of Letters Patent. Patented Sept. 11, 1917.

Application filed November 7, 1916. Serial No. 130,036.

*To all whom it may concern:*

Be it known that I, HENRY J. DUBOIS, a citizen of the United States, residing at Putnam, in the county of Windham and State of Connecticut, have invented new and useful Improvements in Antirattling Gears, of which the following is a specification.

This invention relates to gear elements, the object in view being to produce a novel arrangement of teeth arranged in such relation to each other as to compensate for wear in the meshing of said gear element with another gear element thereby preventing rattling caused by looseness or wear between the teeth of intermeshing gears.

With the above and other objects in view, the invention consists in the novel construction, combination and arrangement of parts, herein described, illustrated and claimed.

In the accompanying drawings:—

Figure 1 is a side elevation of a gear wheel embodying the present invention.

Fig. 2 is a diametrical section through the same.

Fig. 3 is a fragmentary section on the line 3—3 of Fig. 1.

Fig. 4 is a fragmentary section on the line 4—4 of Fig. 1.

Fig. 5 is a fragmentary view looking toward the toothed face of the wheel.

The gear element contemplated in this invention is shown for convenience in the form of a circular toothed or spur gear wheel and in carrying out the invention, the gear element is divided into two gear members 1 and 2 each shown in the form of an annular rim, the member 1 having spur gear teeth 3 on the periphery thereof and the member 2 having corresponding teeth 4 on the periphery thereof. The teeth on the two gear members 1 and 2 are equal in number and are primarily of the same shape, size and pitch.

In the preferred embodiment of this invention, the gear member 1 is provided with a hub 5 which is connected to the rim or gear member 1 by means of spokes 6. Likewise the gear member 2 is provided with a hub 7 connected therewith by means of spokes 8. One of the hub members, 7, is shown as fitting telescopically through the hub section 5 of the other gear member.

The gear member 1 is provided with a spring seat or spring holding cup 9 while an adjoining spoke of the other gear member is likewise provided with a spring seat or spring holding cup 10. These cups 9 and 10 are arranged in circumferential alinement with each other as clearly shown in Fig. 3 and a compensating spring 11 is interposed between said cups or seats and has its end portions inserted therein and if desired anchored or secured in place.

The gear members 1 and 2 lie side by side so that the teeth 3 and 4 are in transverse alinement with each other. The gear members may be held in this position and prevented from separating or moving apart by any suitable means such as by fastening the interfitting hubs 5 and 7 together in such a way as to prevent the same from moving laterally of the wheel while admitting of the necessary relative turning movement of the gear members or sections. Additional means for the same purpose is shown as comprising a pair of U-shaped stops or extensions 12 formed on the spokes of one of the gear members and having recurved hooklike portions 13. These hooks 13 are adapted to ride over the spokes of the other gear section as clearly indicated in Fig. 4 thereby preventing said gear members from moving apart while admitting of a relative axial or turning movement of the same. The stops 12 also serve as means for limiting the relative axial or turning movement of the gear members.

As wear takes place between the gear element hereinabove described and another gear element with which it meshes, the wear is compensated for by the springs 11 one or more of which may be used as found desirable. This causes the teeth of one of the gear members 1 and 2 to ride against one tooth of the intermeshing gear while the transversely alined tooth of the improved gear rides or bears against the adjacent tooth of the intermeshing gear. This overcomes the rattle and noise incident to the intermeshing of two gears after wear has taken place therein.

I claim:—

A gear wheel comprising two gear members having spokes and arranged side by side and also having teeth primarily in transverse alinement with each other, yieldable means associated with the spokes, said gear members admitting of a relative circumferential movement between the gear members, and means on a spoke of one of said members engaging an adjacent spoke of the other member and serving to prevent relative lateral movement of said members while limiting the relative circumferential movement thereof.

In testimony whereof I affix my signature.

HENRY J. DUBOIS.